Feb. 21, 1961  G. L. HELLER  2,972,473
APPARATUS FOR DISPERSING CARBON BLACK IN A LIQUID MEDIUM
Original Filed Nov. 18, 1953
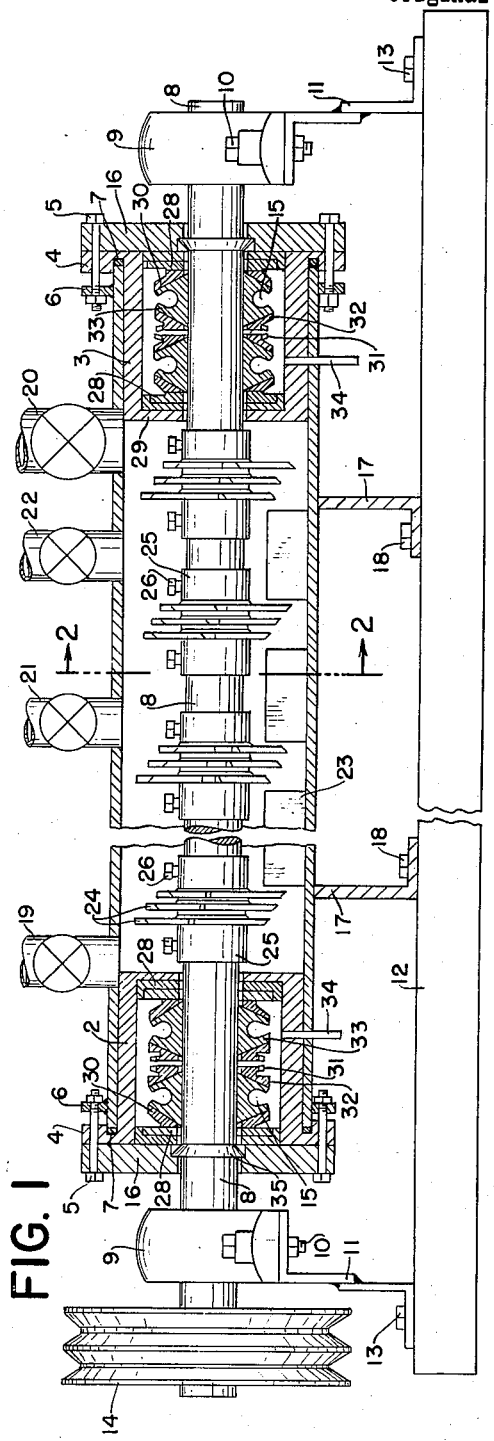
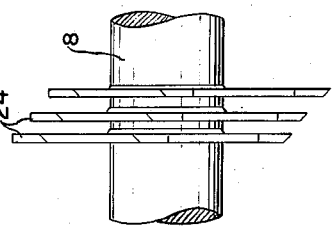
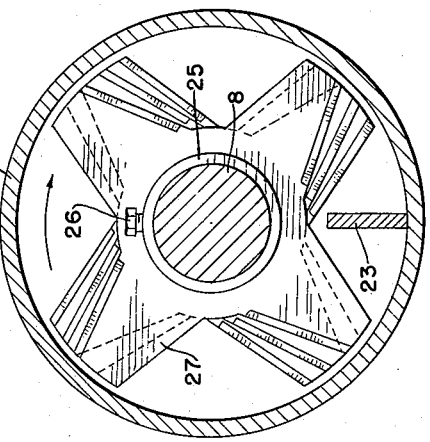
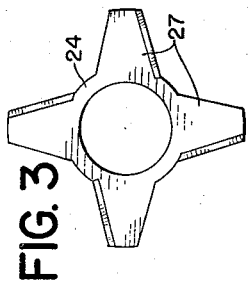
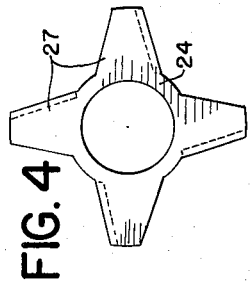
INVENTOR
GEORGE L. HELLER
BY
Pennie, Edmonds, Morton, Barrows & Taylor
ATTORNEYS United States Patent Office 2,972,473
Patented Feb. 21, 1961

2,972,473

APPARATUS FOR DISPERSING CARBON BLACK IN A LIQUID MEDIUM

George L. Heller, Monroe, La., assignor to Columbian Carbon Company, New York, N.Y., a corporation of Delaware Original application Nov. 18, 1953, Ser. No. 392,955. Divided and this application May 21, 1957, Ser. No. 660,539

4 Claims. (Cl. 259—9)

The present invention relates to novel apparatus of particular utility in the agglutinating of carbon black and natural or synthetic rubber, or other polymeric materials, and in the continuous production of aqueous carbon black slurries adapted for such use, as described and claimed in my copending application Ser. No. 392,955, filed November 18, 1953, now abandoned, of which the present application is a division.

Carbon black is extensively used as a reinforcing agent in rubber. It has for many years been conventional practice to incorporate the carbon black in the coagulated rubber by vigorous milling. This method has proved tedious and costly and, in some instances, has deleteriously affected the properties of the finished rubber product.

More recently, extensive research has been carried on in view of developing a satisfactory, practical method of dispersing carbon black in rubber by mixing the black with the rubber latex, prior to the coagulation of the rubber. But in most instances these efforts have led only to batch operations, requiring the use of dispersing agents for effecting and maintaining satisfactory dispersion of the carbon black in aqueous slurry form until it can be later incorporated with the latex. Such operations have been costly with respect to equipment and labor, have produced ununiform results, due to lack of uniformity of the carbon black slurry, and the presence of the dispersing agents has deleteriously affected the characteristics of the finished rubber product.

In view of producing a more uniform slurry for mixing with the latex, it has been proposed to grind the carbon black in water. But such procedure has presented serious difficulties due to erosion of the grinding surfaces by the carbon black, and the binding, plugging and stoppage of the grinding mill.

In Patent No. 2,769,795 issued on an application of Harold A. Braendle, copending with my above-noted application Ser. No. 392,955, there is described and claimed an improved process for dispersing carbon black in rubber latices, which is adapted to continuous operation, and in accordance with which a stream of uniform aqueous slurry of carbon black is prepared by continuously feeding carbon black and water, in predetermined proportions, to a mixing chamber and uniformly dispersing the carbon black in the water stream by violent hydraulic turbulence and impact. The resultant stream of slurry is then immediately and continuously blended with a stream of the latex under conditions of violent hydraulic turbulence and impact.

The apparatus of my present invention is especially adapted to the carrying out of the process of said Braendle Patent 2,769,795, and especially the process described and claimed in my said copending application, in large, commercial scale operations.

The apparatus of my present invention will be further described and specifically illustrated with reference to the accompanying drawings which represent apparatus which has been used with particular advantage in carrying out the process of my said application. It will be understood, however, that the invention in its broader aspect is not limited to the particular embodiment thereof shown in the drawings.

Figure 1 of the drawings is a longitudinal, sectional view of a mixing conduit, showing in elevation apparatus auxiliary thereto;

Figure 2 is a transverse sectional view along the line 2—2 of Figure 1;

Figure 3 is a plan view of a rotor comprising blades having their forward edges beveled on their upstream side;

Figure 4 is a similar view of a rotor comprising blades having their forward edges beveled on their downstream side; and Figure 5 is a fragmentary view showing one means of securing the rotors to the rotatably mounted shaft.

Referring more particularly to Figure 1, the mixing conduit consists of an elongated tubular member 1, closed at its upstream end by the sealing member 2 and closed at its downstream end by the sealing member 3. These sealing members fit into the respective ends of the conduit 1, have radially extending flanges 4, and are held in position by machine bolt 5 and the flanges 6, the latter being securely fastened, as by welding, to the tubular member 1. Leakage between the walls of the tubular member 1 and the sealing members 2 and 3 is prevented by sealing gaskets 7.

The shaft 8 extends coaxially through the entire length of the mixing conduit and is rotatably supported at each end of the bearings 9, these bearings being, in turn, secured by machine bolt 10 to adjustable brackets 11, fastened to the base plate 12 by means of bolts 13. The shaft is provided at its left-hand end with a pulley 14, or other suitable means, for connecting the shaft by belt, or otherwise, with an electric motor, or other suitable power source, not shown, for rotating the shaft at high speed.

The shaft 8 extends through the sealing members 2 and 3 and is sealed therein against leakage by means of mechanical shaft seals 15, hereinafter more fully described, adapted to be held in positon by the end plates 16.

The conduit 1 is supported by brackets 17 which are fastened to the base 12 by means of bolts 18. The conduit is provided at its upper side with an inlet 19, an outlet 20, and intermediate valved inlets 21 and 22, the latter inlets being for the introduction of latex, or other materials, as hereinafter more fully described.

Stators 23 project inwardly from the wall of the conduit and are secured thereto by welding or other suitable means. As will hereinafter appear, these stators are relatively thin sheets. They are of substantially greater length than thickness and are positioned with their broad sides extending longitudinally of the conduit. Intermediate these stators there are groups of rotors 24, each about one-eighth inch thick extending radially from the shaft 8. These rotors may be permanently fastened to the shaft as by welding, as shown in Figure 5 of the drawing, but are, with advantage, welded to collars 25 adapted to be moved along the shaft, so as to adjust the position of the rotors 24 with respect to the stators 23, and held in position by the set-screws 26.

As more clearly shown in Figures 3 and 4 of the drawing, these rotors 24 are composed of four outwardly extending arms or blades 27 on centers spaced 90° apart, each rotor thus comprising a plurality of flat blades of substantial uniform thickness symmetrically spaced about the shaft and lying in a common plane perpendicular to the longitudinal axis of the shaft. The forward edge of each of these arms is so constructed as to form a knife edge. These knife edges are, with advantage, formed by beveling one side of the forward edge of each arm, the other side of the edges remaining straight. Particularly advantageous results have been obtained where the beveled surfaces of adjacent groups of rotors face in opposite directions, so as to exert opposing propelling action on the stream of slurry passing through the conduit.

It will be understood, however, that the invention contemplates still other types of rotors, including rotors having a greater or lesser number of arms and blades having cutting edges beveled equally from each side, as well as an arrangement of blades of the specific type shown having all of the beveled edges facing in the same direction. But the preferred arrangement is that shown, as it has been found to give most satisfactory results. The invention also contemplates blades having both forward and rearward edges sharpened.

I have also found it most advantageous to position the rotors on the shaft so that the cutting edge of each blade is spaced from the corresponding cutting edge of the next adjacent blade or blades of the group by an angle of about 30°. This angle may be varied somewhat but I have found that for optimum results an angle of about 30° is most advantageous. As to those groups of blades having beveled edges facing downstream, the leading blade should be on the upstream side, and as to those groups having their beveled edges facing upstream, the leading edges should be on the downstream side, as shown more particularly in Figure 2 of the drawing.

The diameter and length of the mixing conduit is subject to some variation, the optimum dimensions depending on charging rates, rate of rotation of the blades and number of cutting edges and the characteristics of the particular carbon black being processed. I have, with advantage, used mixing conduits of the type shown ranging from 2 to 3 feet long and 2 inches, 4 inches and 6 inches in diameter, respectively. With smaller diameters, mechanical difficulties are encountered. The diameter should not be so great as to permit any substantial holdup of any of the materials passing therethrough, so that the rate of discharge of any constituent might differ from the rate of feed.

These blades should be adapted to be rotated at a rate to give a tip velocity of the order of at least 3,500 feet per minute. With mixing conduits 4 inches in diameter, the blade assembly should be adapted to be rotated at about 5600 r.p.m., with a 6 inch conduit, 3600 r.p.m. and with a 2 inch conduit, 7200 r.p.m.

A mixture of carbon black and water in measured, predetermined proportions is introduced through the inlet 19 and, while passing as a flowing stream through the conduit, is subjected to the violent impact of the rapidly rotating blades and the violent churning agitation caused by said rotation, while mass rotation of the stream with the blades is substantially inhibited by the intervening stators. Where the carbon black is introduced in pellet form, this violent impact and shearing action causes rapid disintegration of the pellets and uniform dispersion of the carbon black in the water to produce a uniform stream of carbon black slurry.

According to one aspect of the invention, while this stream of slurry is being subjected to this violent agitation, a stream of the latex is introduced in measured predetermined proportion through the inlet 21 or 22, and by reason of the turbulent condition of the flurry stream and continued agitation caused by the subsequent rotating blades, the latex is substantially instantaneously, uniformly mixed with the slurry. The resultant mixture is continuously withdrawn from the mixing conduit through the outlet 20 and passed directly to the coagulation tank.

In this procedure, there is no holdup of the carbon black, or any of the other added materials and, therefore, the concentration of carbon black in the slurry at the point of mixing with the latex is dependent solely upon the proportions of carbon black and water charged to the system. Further, this slurry is immediately mixed with the latex and, therefore, no settling nor localized concentration of the carbon black can occur, and the mixing of the slurry with the latex is so rapid as to effect uniform mixing before any coagulation of the latex can proceed.

Particularly in the type of operation just described, it is advantageous that the charging rate with respect to the diameter of the mixing chamber be so correlated as to result in a relatively high linear velocity of the mixture through the mixing conduit, say of the order of 1 to 5 feet per second, and more advantageously, about 4 feet per second. In order to obtain such high velocities, it is generally necessary to supply the carbon black-water mixture under considerable pressure and to avoid leakage from the mixing conduit around the rotating shaft, special sealing means is frequently necessary. Various types of sealing means, suitable for this purpose, are available, for instance, various balanced-pressure seals and mechanical seals.

I have, with particular advantage, used a mechanical shaft seal of the type marketed under the trade-name Syntron, and shown in Figure 1 of the drawings, somewhat enlarged for clarity. This seal is composed of stationary graphite rings 28, sealed into each end of the members 2 and 3 by rubber rings 29. The steel members 30 rotate with the shaft and form a pressure contact with the graphite rings, being forced against said rings by the coil springs 31 acting on the beveled steel members 32 and the intervening U-shaped rubber rings 33. By this action, the rubber rings are forced against the shaft with which they rotate, forming a seal between the rotating elements and the shaft. I have found it further advantageous to maintain water pressure of about 2 to 5 pounds on the chamber within the sealing members 2 and 3, the water being supplied to the chamber through tubes 34. Where the shaft is to be subjected to thrusts, it may be constructed with shoulders 35 adapted to bear on the end plates 16.

The duration of the agitation of the latex, or other added ingredient, with the slurry can be varied depending upon whether the latex is introduced through inlet 21 or through inlet 22. Additional intermediate inlets may be provided, where desired, to permit further variation in the duration of this mixing.

I have generally found it most advantageous to space the rotors along the shaft in groups of three with intervening stators. It will be noted, however, that such grouping is not essential. Stators may be placed between each pair of rotors, but the additional construction cost is not usually warranted. The rotors may be arranged in groups of more than three but, as the number of rotors per group is increased, there develops a tendency toward mass rotation of the stream with the groups of rotors and the severity of the impact is somewhat lessened.

A particularly effective embodiment of the invention was constructed substantially as shown in the drawings, using a piece of standard 6 inch pipe, 31 inches long as the mixing conduit. The shaft was of 2 inch cold rolled steel. Five stators of stainless steel, 3/16 inch thick, 1 inch high and 3 inches long were welded to the lower inner wall of the conduit so as to project vertically inwardly and spaced apart 1½ inches. Six groups of rotors, of 3 rotors each, were spaced along the shaft, as shown in the drawings, the rotors of each group being spaced apart ¼ inch. The clearance between the outer edges of the blades and the inner wall of the conduit was 1/16 inch. These blades were constructed, as shown in the drawings, with sharp forward edges, the beveled faces of the blades of each group opposing those of the adjacent group of blades, in order to neutralize pumping or propeller action and to cause increased turbulence. The inlets 19, 21, and 22 were of 1 inch pipe and the outlet 20 was of 1½ inch pipe, each welded to the mixing conduit. The center line of inlet 21 was 16¾ inches downstream from the center line of inlet 19. The distance between center lines of inlet 21 and 22 was 5 inches and the distance between the center line of inlet 22 and outlet 20 was 3¾ inches. The leading edge of each blade was spaced 30° from the leading edges of the adjacent blade or blades of the group. The blades were 1/8 inch thick.

It will be understood that these dimensions may be varied somewhat. However, the diameter of the mixing conduit should not be sufficiently great to interfere with the flowing-stream characteristics, or to permit any separation or localized concentration, of the materials passing therethrough and the clearances should be sufficiently great to avoid any grinding or smearing action.

I have, for instance, with advantage, used mixing conduits 4 inches in diameter and 2 inches in diameter. A six inch diameter conduit is presently preferred because of its greater capacity. But conduits much in excess of 6 inches in diameter are apt to result in less uniform mixing.

I have found that where the forward edges of the blades are blunt, too great an amount of heat is developed by friction at the necessary high velocity of the blades, and an excessive amount of work is required to effect their rotation. Even more important is the tendency of the rapidly rotating blades to push the suspension ahead of the blade without cutting through the liquid to exert adequate disrupting forces on the carbon black pellets or aggregates to be disintegrated and dispersed. I have further found it advantageous, though not essential, that the rearward edges of the blades also be sharpened, as this inhibits cavitation and also lessens blade friction and temperature build-up.

It is important to avoid too great a temperature build-up in the mixing conduit, as elevated temperatures tend to accelerate unduly the rate of coagulation of the latex when the resultant slurry is mixed therewith. My invention provides apparatus whereby maximum dispersion of the carbon black is effected without objectionable increase in slurry temperature.

In forming the slurry, it is particularly advantageous to avoid the addition of any so-called dispersing agent, i.e. agents for aiding in the dispersion of the black in the water or for stabilizing the resulting suspension. In the absence of such agents, it is important that the resultant slurry stream be immediately mixed with the latex before any separation, or local concentration, of the black can occur. It is also important that the mixing of the slurry with the latex be exceedingly rapid in order to avoid formation of rubber curds, or aggregates containing excessively large proportions of carbon black, which have been found to be exceedingly difficult to disperse by subsequent milling.

In accordance with my present invention, uniform mixing of the slurry with the latex may be effected substantially instantaneously by continuously charging a stream of latex at a uniform predetermined rate into a zone of the mixing conduit previously described intermediate its ends and downstream from the zone in which the uniform carbon black slurry is formed. The mixing is thus rapidly effected by the violent agitation within the mixing conduit and the resultant latex mixture is continuously passed from the conduit and immediately coagulated by the adding of acid, or other conventional coagulant, with agitation.

As an alternative, the carbon black slurry may be formed in the mixing conduit and continuously passed therefrom as a stream, and this stream of slurry immediately blended with a stream of the latex, in predetermined proportions, under conditions of violent turbulence, for instance, by violent impact of one stream with the other. The resultant mixture is then passed immediately to the coagulating tank and coagulated, as previously described.

The action of the blades within the mixing conduit is not to be confused with a grinding or smearing action. It is essential that the clearances between the rotating blades and the wall of the conduit, and other stationary parts therein be sufficiently great to avoid grinding or smearing of the black, as such conditions have been found to result in a build-up of the black on the solid surfaces, eventually necessitating discontinuing the operation. In the apparatus of my present invention, clearances between moving metal surfaces are not less than about 1/16 inch, preferably within a range of 1/16 inch to 1/8 inch.

I claim:

1. Apparatus for effecting the dispersion of carbon black in a liquid medium, whereby a uniform stream of the dispersion may be continuously produced, comprising an elongated, tubular conduit of relatively small and substantially uniform cross-sectional area and a closure member at each end of said conduit, forming an enclosed mixing chamber adapted to be maintained under superatmospheric pressure, a rotatably mounted shaft extending coaxially through said conduit, supported by said end-closure members and sealed therein against leakage, conduit means adapted to the introducing of the carbon black and the liquid medium under pressure into one end of the mixing chamber, an outlet conduit at the opposite end of the chamber, a plurality of stators spaced apart over the length of the chamber, extending inwardly from the wall thereof, of greater length than thickness and positioned with their broad sides extending longitudinally of the chamber, a multiplicity of rotors of equal diameters mounted on the shaft, each rotor comprising a plurality of radially-extending blades, each about one-eighth inch in thickness over the major portion of their areas, but having sharp forward edges, the blades of each rotor lying in a plane perpendicular to the longitudinal axis of the shaft, and the rotors being adapted to rotate with the shaft out of contact with the chamber wall and stators, said rotors being spaced along the shaft intermediate the respective stators and said shaft and rotors being adapted to be rotated at a blade-tip velocity of at least 3500 feet per minute.

2. The apparatus of claim 1 in which the rotors are grouped in multiples along the shaft intermediate the respective stators.

3. The apparatus of claim 1 further characterized in that there is provided at least one conduit opening into the mixing chamber at a point intermediate the inlet conduit means and the outlet conduit.

4. The apparatus of claim 1 further characterized in that the rotors are grouped in multiples along the shaft intermediate the respective stators and the forward edges of the blades of one rotor of a group are circumferentially spaced from the forward edges of the blades of the adjacent rotor of the group by an angle of about 30°.

References Cited in the file of this patent

UNITED STATES PATENTS

| 638,743 | McLellan | Dec. 12, 1899 |
| 857,179 | Jacolucci | June 18, 1907 |
| 1,246,003 | Headley | Nov. 6, 1917 |
| 1,363,368 | Sonsthagen | Dec. 28, 1920 |
| 1,745,291 | Bleil | Jan. 28, 1930 |
| 2,507,819 | Schneider | May 16, 1950 |
| 2,804,112 | Schaller | Aug. 27, 1957 |

FOREIGN PATENTS

| 689,465 | France | May 27, 1930 |